(12) United States Patent
Fu et al.

(10) Patent No.: US 8,738,901 B2
(45) Date of Patent: May 27, 2014

(54) AUTOMATIC CERTIFICATE RENEWAL

(75) Inventors: Christina Fu, Saratoga, CA (US); Andrew Wnuk, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 388 days.

(21) Appl. No.: 12/625,423

(22) Filed: Nov. 24, 2009

(65) Prior Publication Data

US 2011/0126001 A1    May 26, 2011

(51) Int. Cl.
    *H04L 29/06* (2006.01)
(52) U.S. Cl.
    USPC .......................................................... 713/156
(58) Field of Classification Search
    USPC .......................................................... 713/156
    See application file for complete search history.

(56) References Cited

U.S. PATENT DOCUMENTS

| 7,047,409 B1* | 5/2006 | Aull et al. ...................... 713/173 |
| 7,209,563 B1* | 4/2007 | Calvez et al. ................. 380/278 |
| 7,484,089 B1* | 1/2009 | Kogen et al. .................. 713/156 |
| 2003/0105955 A1* | 6/2003 | Carroll et al. ................. 713/156 |
| 2005/0076203 A1* | 4/2005 | Thornton et al. ............. 713/156 |
| 2008/0209207 A1* | 8/2008 | Parupudi et al. ............. 713/156 |

OTHER PUBLICATIONS

Red Hat, "Red Hat Certificate System 8.0 Admin Guide", Jul. 22, 2009, 528 pages.*
Red Hat Certificate System 8.0—Admin Guide, Publication date Jul. 22, 2009, 108 pages, published at http://www.redhat.com/docs/manuals/cert-system/8.0/admin/Admin_Guide.pdf.

* cited by examiner

*Primary Examiner* — Michael S McNally
(74) *Attorney, Agent, or Firm* — Lowenstein Sandler LLP

(57) ABSTRACT

A method and system for automatic certificate renewal is described.

18 Claims, 4 Drawing Sheets

AUTOMATIC CERTIFICATE RENEWAL

TECHNICAL FIELD

Embodiments of the invention relate to the field of digital certificate management, and more particularly, to digital certificate renewal.

BACKGROUND

Authentication is the process of confirming an identity. For network interactions, authentication involves the identification of one party by another party. There are many ways to use authentication over networks, such as password-based authentication and certificate-based authentication. A digital certificate, commonly referred to as a certificate, is an electronic document used to identify an individual, a server, a company, or another type of entity and to associate that identity with a public key. Certificates have the purpose of establishing trust. Their usage varies depending on the kind of trust they are used to ensure.

Network interactions typically take place between a client, such as a web browser, and a server. Client authentication refers to the identification of a client (the person assumed to be using the software) by a server, while server authentication refers to the identification of a server (the organization assumed to be running the server at the network address) by a client. Client authentication and server authentication are not the only forms of authentication that certificates support. For example, the digital signature on an email message, combined with the certificate that identifies the sender, can authenticate the sender of the message. Similarly, a digital signature on an HTML form, combined with a certificate that identifies the signer, can provide evidence that the person identified by that certificate agreed to the contents of the form. In addition to authentication, the digital signature in both cases ensures a degree of non-repudiation, because a digital signature makes it difficult for the signer to claim later not to have sent the email or form.

There are two main types of certificates: signing certificates and encryption certificates; although there may be other types of certificates as well. Also, some certificates may be dual-use certificates, such as certificates that operate as a signing certificate as well as an encryption certificate. One example of a signing certificate is a client Secure Sockets Layer (SSL) certificate. A client SSL certificate is used for client authentication to servers over SSL. The SSL protocol governs server authentication, client authentication, and encrypted communication between servers and clients. When using a SSL client certificate to authenticate a client to a server, it is assumed that the client presents a valid certificate that can be used to identify the client to the server. For example, a bank gives a customer an SSL client certificate that allows the bank's servers to identify that customer and authorize access to the customer's accounts. In another example, a company gives a new employee an SSL client certificate that allows the company's servers to identify that employee and authorize access to the company's servers.

Similarly, a SSL server certificate is used for server authentication to clients over SSL. For example, Internet sites that engage in electronic commerce usually support certificate-based server authentication to establish an encrypted SSL session and to assure customers that they are dealing with the web site identified with the company. The encrypted SSL session ensures that personal information sent over the network, such as credit card numbers, cannot easily be intercepted. Server authentication may be used with or without client authentication.

Certificate authorities (CAs) validate identities and issue certificates. CAs can be either independent third parties or organizations running their own certificate-issuing server software, such as a certificate system. The methods used to validate an identity vary depending on the policies of a given CA for the type of certificate being requested. Before issuing a certificate, a CA must confirm the user's identity with its standard verification procedures. The certificate issued by the CA binds a particular public key to the name of the entity identified by the certificate, such as the name of an employee or a server. Only the public key included in the certificate will work with the corresponding private key possessed by the entity identified by the certificate.

In addition to a public key, a certificate typically includes the name of the entity it identifies, an expiration date, and the name of the CA that issued the certificate. In most cases, a certificate also includes the digital signature of the issuing CA. The CA's digital signature allows the certificate to serve as valid credentials for users who know and trust the CA, but may not know the entity identified by the certificate. Since certificates have an expiration date, such as, for example, 2-3 years, certificates need to be renewed to avoid expiration. Conventional certificate systems receive renewal requests in order to initiate the renewal process. However, these conventional systems are configured to receive such requests from a requester, such as an end user, an agent acting on behalf of the CA, an administrator, or other types of people. Since the conventional systems receive the renewal requests from a person, the identity of the person needs to be authenticated to authorize the renewal request. In some cases, the renewal requests are manually authenticated and approved by an agent of the CA, and in other cases, the certificate system has to receive a valid, non-expired SSL client certificate to authenticate the client's identity before the renewal request can be approved. These conventional systems are limited in the types of certificates that can be renewed, since not all certificates are SSL certificates. This approach may also limit renewal requests to certificates that have not expired, since a valid, non-expired certificate is required to be presented with the renewal request. This approach is inflexible to scenarios where an entity inadvertently fails to renew the certificate before the expiration date, or where it is impractical or impossible to renew the certificate before the expiration date. There may also be scenarios where a certificate is issued to a particular machine, instead of to a user, and the machine would need a user to determine whether this certificate is expiring and request its renewal on behalf of the machine.

Existing certificate systems fail to provide adequate mechanisms to renew all types of digital certificates, and conventionally are limited to non-expired, signing certificates.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
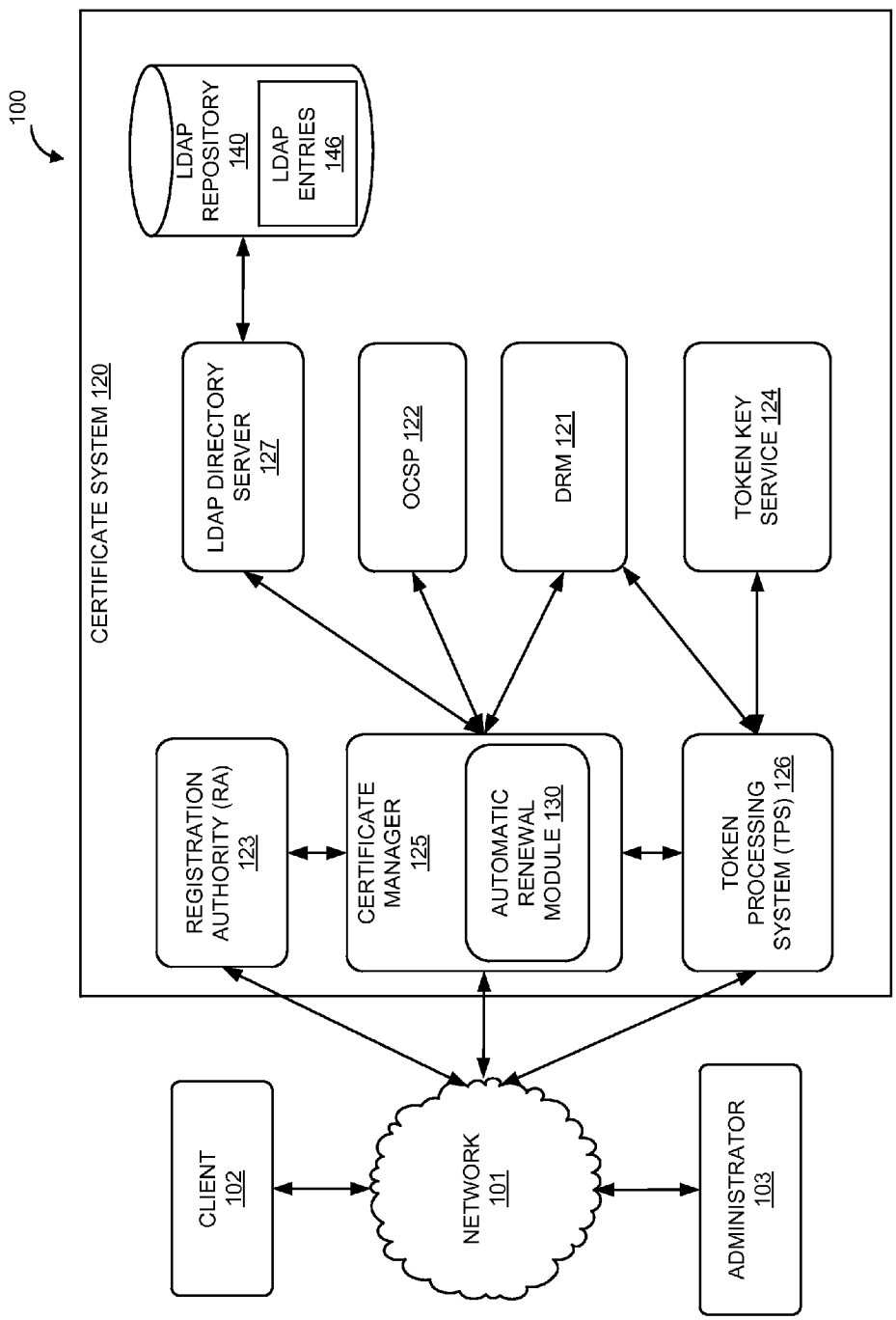
FIG. 1 is a block diagram of exemplary system architecture in which embodiments of a certificate system configured for automatic certificate renewal may operate.

A method and system for automatic certificate renewal is described. In one embodiment, a method, implemented by a computing system programmed to perform operations, includes searching by a certificate manager a certificate authority (CA) database having records of digital certificates to detect a certificate that satisfies an expiration condition for automatic renewal. The method automatically renews the detected certificate as a renewed certificate without receiving from a user a certificate renewal request for the certificate.

Embodiments of the present invention provide an improved approach to certificate renewal. By using automatic renewal, the renewal process can be simplified, allowing renewals without end-user interaction. As described above, conventional systems receive renewal requests from a person, such as an end user or an agent. Since the requester is a person, the certificate manager needs to authenticate the requester and authorize the renewal request. For example, the renewal request needs to be manually authenticated and authorized by an agent of the CA. Unlike the conventional systems, the embodiments described herein automatically renew certificates that are about to expire or have expired without user interaction, i.e., the certificate manager does not have to receive a renewal request from a person, but rather the renewal request for the expiring certificate is initiated within the CA. Since the renewal request is initiated within the CA, there is no need to authenticate and authorize the renewal request as done with a person-initiated renewal request. The embodiments described herein automatically renew the expiring certificate and publish the renewed certificate in the CA database. When a device or a user discovers that the certificate has expired, the device queries the CA database to acquire the renewed certificate. The automatic renewal by the CA is secure because the automatic renewal does not involve the private keys. Since the CA already has the public key of the expiring certificate in the CA database, the CA can generate a renewed certificate that has the same public key as the expiring certificate, but can update the expiration date of the renewed certificate.

The embodiments described herein allow the CA to automatically renew all types of certificates. An administrator of the CA can configure the automatic renewal module to define which types of expiring certificates to automatically renew, the expiration conditions to search for in the CA database, and when to perform the searches. In one embodiment, the administrator configures a job scheduler to initiate a search at a specified time or at specified intervals, and to configure parameters of the search, such as what types of certificates to search for, the expiration conditions (e.g., expired within a designated time frame, etc.), or the like.

As described above, there may be scenarios where a certificate is issued to a particular machine. Instead of a user manually determining whether the certificate is expired or about to expire and submitting a renewal request on behalf of the machine, the machine, using the embodiments described herein, can look up the corresponding entry in the CA to retrieve the renewed certificate that was automatically renewed by the CA. In some cases, the machine is programmed to automatically check to see if there is a renewed certificate published in the CA database, for example, upon start-up. In other cases, the machine is programmed to determine whether the certificate is about to expire and fetches the renewed certificate from the CA database. The embodiments described herein automatically renew the certificates of these machines, allowing the machines to update their expiring certificate without user interaction or user intervention, as done conventionally, to detect expiring certificates and to submit certificate renewal requests on behalf of the machines.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "searching," automatically renewing," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of a certificate system configured for automatic certificate renewal may operate. The architecture 100 includes a client 102, an administrator workstation 103 and a certificate system 120, each coupled to the network 101 that communicates any of the standard protocols for the exchange of information. The network 101 may be a Local Area Network (LAN) and may be incorporated into the same physical or logical system, or different physical or logical systems. Alternatively, the certificate system 120 and client 102 may reside on different LANs that may be coupled together via the Internet but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120, administrator workstation 103 and the client 102.

The certificate system 120 may be hosted on one or more machines including one or more server computers, gateways or other computing systems. In one embodiment, the certificate system 120 resides on multiple servers, including a CA server that hosts the certificate manager 125, and the end users and/or agents on the client 102 can interact with the certificate system 120 via web browser applications on the client 102. It should be noted that various other network configurations can be used including, for example, hosted configuration, distributed configurations, centralized configurations, etc. The certificate system 120 includes various certificate system subsystems, including a key recovery authority 121, sometimes called a data recovery manager (DRM), an online certificate status responder (OCSP) 122, a Lightweight Directory Access Protocol (LDAP) directory server 127, the token key system (TKS) 124, a certificate manager 125, and the token processing system (TPS) 126.

The certificate manager 125 may operate as a CA that can issue, renew, revoke, and publish a wide variety of certificates, for servers, for users, for routers, for other subsystems, and for file or object signing. The certificate manager 125 can be implemented as software, hardware, firmware or any combination thereof. The certificate manager 125 is the core of a CA's Public Key Infrastructure (PKI). The PKI is a set of hardware, software, people, policies, and procedures needed to create, manage, distribute, use, renew, and revoke digital certificates. The certificate manager 125 can also compile and publish certificate revocation lists (CRLs). The certificate manager 125 may be structured in series with other certificate managers 125. The certificate manager 125, which is sometimes referred to as the CA server, can establish and maintain relationships between other subsystems of the certificate system 120.

Certificates are created based on a specific, unique key pair. If a private key is ever lost, then the data which that key was used to access (such as encrypted emails) is also lost because it is inaccessible. The DRM 121 stores key pairs, so that in case a token is lost or broken, the keys can be recovered and the certificates can be retrieved and restored on the token.

The OCSP 122 verifies whether a certificate is valid and not revoked. This function can also be done by the certificate manager 125, which has an internal OCSP service, but using an external OCSP eases the load on the issuing CA (certificate manager 125). The certificate system 120 may also include a registration authority (RA) 123, which accepts certificate requests and verifies, independently, whether that request should be approved. It then forwards approved requests to the certificate manager 125 to issue the certificate. Like the OCSP, this is a function that can be performed by the certificate manager 125, but using a separate subsystem reduces the load on the certificate manager 125.

The TKS 124 derives keys based on token identifier information, private information, and/or a defined algorithm. These derived keys are used between the token and the TKS 124 to provide a secure channel that allows operations, such as to format tokens and enroll tokens to be processed securely. The TPS 126 interacts directly with external tokens, like the smart card on a client device, and manages the keys and certificates on those tokens through an interface on the client device. The interface contacts the TPS 126 when there is a token operation, and the TPS 126 interacts with the certificate manager 125, DRM 121, or TKS 124, as required, then sends the information back to the token via the interface.

Figure 2:
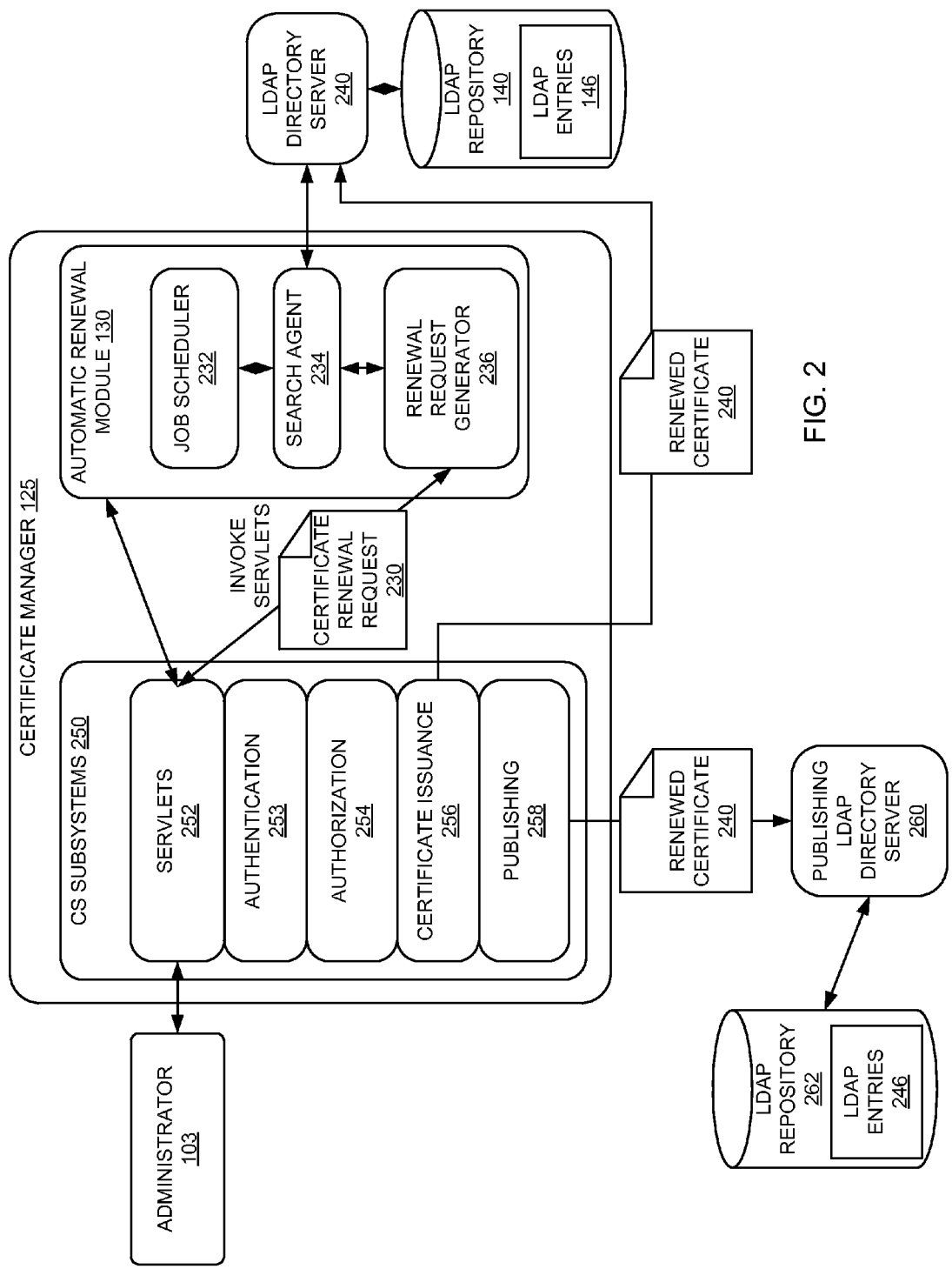
FIG. 2 is a block diagram of one embodiment of a certificate manager including an automatic renewal module that manages automatic certificate renewals.

The certificate system 120 includes a CA database. The CA database may be implemented, for example, using various types of database technologies. In one embodiment, as depicted in FIGS. 1 and 2, the certificate system 120 implements the CA database using a Lightweight Directory Access Protocol (LDAP) directory server 127 that manages LDAP entries 146 stored in the LDAP repository 140. The LDAP directory server 127 may be one or more machines including one or more server computers, gateways or other computing systems. LDAP is a set of open protocols used to access centrally stored information over a network. LDAP organizes information in a hierarchical manner using directories. These directories can store a variety of information and can enable access to the information from any machine on the LDAP enabled network. In other embodiments, the LDAP entry 146 may contain along with the original certificate, the certificate profile used to enroll the original certificate, its public key, the subject DN, the original certificate request, the original certificate's extension, etc., for example. The certificate profile includes a set of rules concerning the issuing of a certificate by the certificate manager 125, for example, the kind of content that is required to submit the request, the way the request is processed and approved (authenticated and authorized), the information that is included in the certificate content, and how long the certificate is valid. In other embodiments, the LDAP entry 146 may contain, along with the original certificate, an original enrollment profile used to enroll the original certificate, its public key, the subject DN, the enrollment request for the original certificate, the original certificate's extension, for example. The original certificate request entry may also contain the original validity period of the certificate and the grace period for renewing the certificate. The grace period is the time before and after the expiration date when renewal is allowed. In one embodiment, if a certificate is outside of the grace period, the certificate cannot be automatically renewed by the automatic renewal module 130. In other embodiments of automatic renewal, the certificate manager 125 can automatically renew certificates that are outside of the grace period. Alternatively, the CA database may be stored on other types of data storage devices that store records of digital certificates in the CA database.

The client 102 may be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device.

In one embodiment, the certificate system 120 provides a customizable profile framework to apply policies for incoming certificate requests and to control the input request types and output certificate types using the certificate profiles. The profile framework, also referred to as the enrollment profile framework is implemented by the certificate manager 125 and is used to approve and issue certificates according to the selected profile. There are two main types of certificate profiles—enrollment request profiles and renewal request profiles. Enrollment is the process for requesting and receiving an issued certificate. The mechanics for the enrollment process may depend on the type of certificate, the method for generating its key pair, and the method for generating and approving the certificate itself. Certificate enrollment, at a high level, may have the following basic steps: a user generates a certificate request and submits to the certificate system 120. The certificate system 120 verifies the request by authenticating the requesting entity and confirming that the request meets the certificate profile rules which were used to submit the request. The certificate system 120 then approves the request, and the user retrieves the new certificate. When the certificate reaches the end of its validity period (as indicated by the expiration date), the embodiments described herein allow the expiring certificate to be automatically renewed using the automatic renewal module 130 of the certificate manager 125 without receiving from a user a certificate renewal request for the certificate at the certificate manager 125. In other embodiments, the certificate system 120 may implement other types of frameworks, such as a policy-based framework that incorporates the automatic renewal module 130.

The automatic renewal module 130 can search the CA database, (e.g., the LDAP directory in the depicted embodiment) for certificate entries 146 that satisfy an expiration condition for automatic renewal. In one embodiment, the expiration condition is that the certificate has already expired. For example, the automatic renewal module 130 can be programmed to search for certificate entries 146 whose certificates expired within the last month. Alternatively, other limits can be put on the searches. In another embodiment, the expiration condition is that the certificate expires within a designated time period. For example, the automatic renewal module 130 can be programmed to search for certificate entries 146 whose certificates have not yet expired, but expire in the next week, next day, next month, or the like. Alternatively, other expiration conditions may be specified to designate when the certificate should be renewed automatically, such as certificates that meet a time condition, such as those that expire in the next week, and meet another condition, such as the type of certificate (e.g., encryption certificates). The certificate entry 146 may be a record in the CA database that contains the original certificate and/or the original enrollment request. In this embodiment, the automatic renewal process finds the original key, certificate request, and/or profile, and regenerates the certificate with an updated expiration date using the same public key as the original certificate as described in more detail below.

The automatic renewal module 130 can automatically renew the detected certificates that satisfy the expiration condition as renewed certificates and/or publish the renewed certificates in the LDAP directory to be retrieved by a user, a machine, or any combination thereof, when needed. It should be noted that the automatic renewal module 130 performs the automatic renewal without user interaction at the certificate manager 125. For example, the certificate manager 125 does not have to receive a renewal request from a person, but rather the automatic renewal module 130 initiates the renewal request for the expiring certificate. Since the renewal request is initiated within the CA, there is no need to authenticate and authorize the renewal request as done with a person-initiated renewal request. In one embodiment, the automatic renewal module 130 can automatically renew certificates that have been issued to a particular client device (e.g., 102). When the device discovers that the certificate expires, the device looks up the certificate entry in the LDAP directory to update the expiring certificate. The automatic renewal by the automatic renewal module 130 is secure because the private key is not used during automatic renewal by the CA. Since an imposter would not have the private key, even if the imposter obtained the renewed certificate, the renewed certificate would be inoperable without the private key. Since the CA already has the public key of the expiring certificate in the LDAP directory, in one embodiment, the certificate manager 125 generates a renewed certificate that has the same public key as the expiring certificate, but updates the expiration date of the renewed certificate. The certificate manager 125 publishes the renewed certificate and stores data concerning the renewed certificate in a certificate entry in the LDAP directory. That can be accessed by the owner when needed.

Although there may be some circumstances where it is desirable to issue a new key pair, in many circumstances, issuing a new key pair can be disruptive since the new certificates will not be functionally identical to the original certificates. For example, an entity that already has the original certificate will need to update all instances of the expired certificate with the renewed certificate, since the original certificate will expire or has already expired and the renewed certificate has different key pairs than the original certificate. In addition, in these embodiments, some additional mechanisms may be needed for security to allow an owner to obtain the renewed certificate with new keys, since the owner does not have the new private key already.

In the embodiments of reusing keys, the certificate manager 125 reuses the public key of the original certificate for the renewed certificate, and sets a new expiration date for the renewed certificate. In this embodiment, the renewed certificate is functionally identical to the original certificate. This allows entities already using the original certificate to use the renewed certificate in place of the original certificate, since the renewed certificate is functionally identical to the original certificate. A certificate system that renews a certificate with the same keys can be a cleaner and faster solution for handling the expiration of many kinds of certificates (especially CA signing certificates), than a certificate system that simply generates a new key pair and installs new certificates for renewal requests. For example, if a new CA signing certificate is created, all the certificates issued and signed by this CA must be reissued. If the CA signing certificate is renewed with the same keys, then all the issued certificates are still valid. A renewed certificate is identical to the original certificate, only with an updated validity period and expiration date.

In one embodiment, the automatic renewal module 130 of the certificate manager 125 can be configured by an administrator on the administrator workstation 103 coupled to the network 101. The administrator workstation 103 may provide web browsing capabilities to render images, documents, etc., in a web browser using uniform resource locators (URLs) or links specified by the administrator (e.g., by activating a link). The web browser allows an administrator to access an administrator console provided by the certificate system 120. The administrator console can allow the administrator to configure the automatic renewal module 130 as described in more detail below.

In the depicted embodiment, the automatic renewal module 130 is implemented within the certificate manager 125. In other embodiments, the automatic renewal module 130 can be implemented on a separate server from the certificate manager 125. For example, a dedicated server may be implemented within the CA to perform the searching of the CA database to detect certificates that satisfy the expiration condition for automatic renewal. In these embodiments, the automatic renewal module 130 submits a certificate renewal request to the certificate manager 125, and the certificate manager 125 automatically approves the certificate renewal request because the certificate renewal request is initiated within the CA.

FIG. 2 is a block diagram of one embodiment of the certificate manager 125 including the automatic renewal module 130 that manages automatic certificate renewals. In the depicted embodiment, the automatic renewal module 130 includes a job scheduler 232, a search agent 234, and a renewal request generator 236, which are described in more detail below.

The certificate manager 125 can present an administrator interface to an administrator 103 of the CA. In one embodiment, the administrator interface is served by one of the servlets 252, and allows the administrator 103 the ability to manage the certificate manager 125 itself, such as for configuring the automatic renewal module 130, adding users, configuring logs, managing profiles and plug-ins, and the CA database, among many other functions. In one embodiment, the servlet 252 is software code, such as Java code, that handles a particular kind of interaction with end entities or agents on behalf of the CS subsystem 250. In one embodiment, the administrator interface allows the administrator to schedule jobs in the job scheduler 232 to perform automatic renewal. In one embodiment, the job scheduler 232 is Cron (short for Chronograph) job scheduler, which is a time-based job scheduler in Unix-like computer operating systems. Cron job schedulers enable users to schedule jobs, such as commands or shell scripts, to run automatically at a certain time or date. In another embodiment, the job scheduler 232 is implemented with threads, where a thread is started to do the job each time the job scheduler wakes up. Alternatively, other types of job schedulers may be used, such as BATCH, Task Scheduler, launchd, or other application software that can perform job scheduling functionality. The job scheduler 232 may provide a single point of control for definition and monitoring of background executions in the certificate manager 125, or in the certificate system 120. The administrator interface may be a Java-based administrative console. Alternatively, the administrator interface may be a HTML-based administrative console. Although these types of interfaces are different, both may be accessed using a server URL and the administrative port number.

The administrator interface can be used by the administrator to configure the job scheduler 232 to initiate a search by the search agent 234 of the LDAP directory at a specified time or at specified intervals. The administrator interface can be used by the administrator to configure the searches performed by the search agent 234, such as for particular types of certificates that satisfy the expiration condition. The search agent 234 can be configured to search for any type of information that is stored in the LDAP entries 146 in order to locate expiring certificates, for example, using search parameters or filters to restrict the search by the search agent 234. The search agent 234 can be configured to search for expiring certificates, but exclude a detected certificate when the detected certificate is a designated type. The search agent 234 searches the LDAP repository 140 for the LDAP entries 146 that satisfy the expiration condition via the LDAP directory server 127. In other embodiments, the search agent 234 searches the CA database using other techniques as would be appreciated by one of ordinary skill in the art having the benefit of this disclosure.

The renewal request generator 236 is configured to generate a certificate renewal request 230 for each detected certificate that satisfies the expiration condition found by the search agent 234. The renewal request generator 236 can generate the requests as a batch of renewal requests after the search agent 234 has finished the search. Alternatively, the renewal request generator 236 generates the certificate renewal request 230 for each detected certificate individually upon detection.

For person-initiated certificate renewal requests, when the certificate manager 125 receives certificate enrollment and renewal requests from a requester (i.e., a person) (not illustrated), the certificate manager 125 invokes a servlet 252 that interacts with other components of the CS subsystem 250 as necessary. In one embodiment, the servlet 252 is software code, such as Java code, that handles a particular kind of interaction with end entities or agents on behalf of the CS subsystem 250. The servlet 252 may be an enrollment servlet that handles the certificate renewal requests according to a particular renewal request profile, as it does for original enrollment requests. The servlet 252 uses the authentication module 253 to authenticate the user's identity. The authentication module 253 may include a set of rules (e.g., implemented as a Java™ class) for authenticating the client 102 that needs to interact with the CS subsystem 250. The authentication module 253 can authenticate the certificate renewal request using agent-based authentication, password-based authentication, certificate-based authentication, client authentication, server authentication, or the like. Once authenticated, the servlet 252 passes the certificate renewal request to an authorization module 254, which determines whether the certificate renewal request has been approved. The profile processing of the authorization module 254 determines whether to approve the certificate renewal request. The authorization module 254 passes the authorized renewal request to a certificate issuance module 256, which issues the renewal certificate 240 accordingly. The profile processing of the certificate issuance module 256 issues the renewed certificate when the certificate renewal request is approved and makes the renewed certificate available for retrieval by a user.

In the embodiments of automatic renewal, when the renewal request generator 236 generates a certificate renewal request 230, the certificate manager 125 invokes the servlet 252. However, since the certificate renewal request 230 is initiated within the CA by the certificate manager 125, instead of by a person as done for certificate renewal request, authentication and authorization is not necessary. Thus, the servlet 252 can automatically authorize the certificate issuance of the renewed certificate 240, skipping the authentication module 253 and the authorization module 254. The profile processing of the certificate issuance module 256 issues the renewed certificate 240 when the certificate renewal request is approved and stores the renewed certificate 240 in the LDAP directory via the LDAP directory server 240 for retrieval by a user of the certificate. In some embodiments of automatic renewal, upon issuance of the renewed certificate, the certificate manager 125 can publish the renewed certificate 240. In one embodiment, the CS subsystem 250 includes a publishing module 258 that publishes the renewed certificate 240 in a publishing LDAP directory, for example, by storing an LDAP entry 246 in the LDAP repository 262 via a publishing LDAP directory server 260. It should be noted that publishing the renewed certificates using the publishing LDAP directory server 260 is just one way of publishing the renewed certificates. In one embodiment, the publishing module 258 notifies the owner of the renewed certificate 240 when the certificate manager 125 has renewed its certificate and provides a link to where the renewed certificate can be accessed for download, such as from the LDAP repository 140 or the LDAP repository 262. Alternatively, the publishing module 258 can publish the renewed certificate 240 in other ways that would be appreciated by one of ordinary skill in the art. In another embodiment, the certificate manager 125 can be set to not publish the renewed certificate 240, and, when the renewed certificate 240 is issued by the certificate issuance module 256, the certificate manager 125 stores the renewed certificate 240 in the LDAP directory via the LDAP directory server 240 for subsequent retrieval by a user. For example, the owner of the renewed certificate 240 can retrieve the renewed certificate 240 from the LDAP repository 140 when it discovers its certificate is expired or about to expire without any notification by the publishing module 258. For another example, the owner of the renewed certificate 240 can automatically check the LDAP directory, such as upon start-up, to see if there is a renewed certificate 240 stored in the LDAP directory. Similarly, the owner of the renewed certificate 240 can retrieve the renewed certificate 240 from the LDAP repository 262, such as upon start-up, to see if there is a renewed certificate 240 stored in the publishing LDAP directory.

In another embodiment, the renewal request generator 236 can send the certificate renewal request 230 directly to the certificate issuance module 256, and the module 256 recognizes that the certificate renewal request 230 does not need to be authenticated and authorized because the certificate renewal request 230 was initiated within the CA, instead of being received from a requester.

The renewal request generator 236 provides information to the CS subsystem 250 to identify which certificate to renew, such as a serial number associated with the detected LDAP entry 146, the original certificate, or other information from the detected LDAP entry 146. The certificate manager 125 identifies the certificate and then maps the renewal request to the original enrollment request entry in the LDAP directory. For example, when the renewal request generator 236 submits a certificate renewal request with a serial number, the certificate manager 125 maps the serial number to the corresponding LDAP entry 146. The certificate manager 125 can access the LDAP entry 146 to extract the original certificate or information associated with the certificate from the LDAP entry 146. In one embodiment, the certificate manager 125 then retrieves at least the public key from the LDAP entry 146. In another embodiment, the certificate manager 125 retrieves the public key and the original enrollment request from the LDAP entry 146. The certificate manager 125 generates the renewed certificate 240 from the information of the LDAP entry 146. For example, the certificate manager 125 issues a new certificate with a new validity period and with the same public key as the original. In one embodiment where the defaults, constraints, and other settings must be the same in the renewed certificate as in the original certificate, it is important that the renewal process access a record of the original enrollment request that contains this information.

In another embodiment, the authorization and certificate issuance module 254 can access the LDAP entry 146 to extract the necessary information to generate the renewed certificate 240 as described above with respect to the certificate manager 125.

In one embodiment, the certificate manager 125 reissues a certificate that has not yet expired. In another embodiment, the certificate manager 125 reissues a certificate that has already expired. It should be noted that while renewal may reissue an expired certificate, it does not reissue a revoked certificate.

Figure 3:
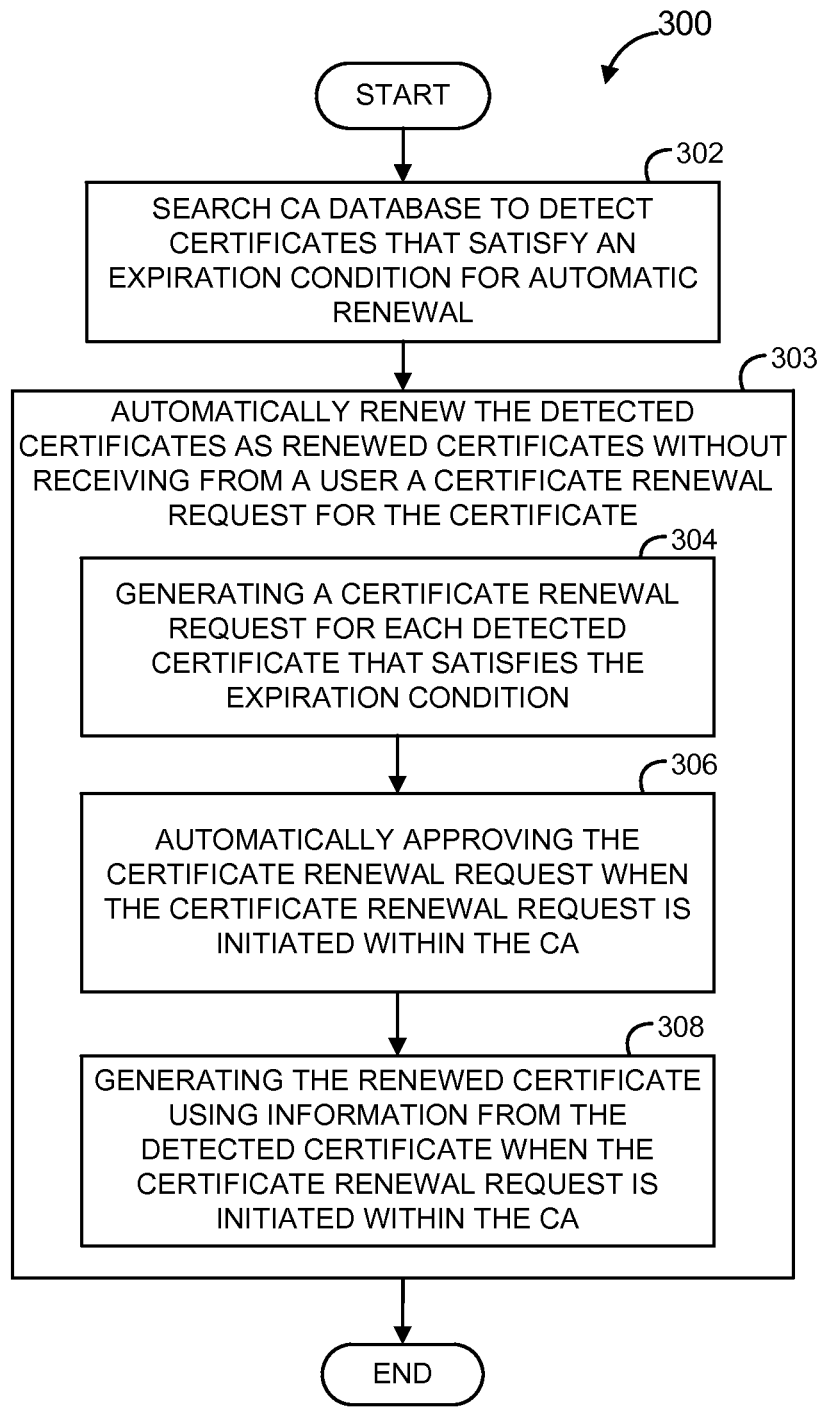
FIG. 3 is a flow diagram of one embodiment of a method of automatically renewing certificates.

FIG. 3 is a flow diagram of one embodiment of a method 300 of automatically renewing certificates. The method 300 is performed by processing logic that may comprise hardware (circuitry, dedicated logic, etc.), software (such as is run on a general purpose computer system or a dedicated machine), firmware (embedded software), or any combination thereof. In one embodiment, the method 300 is performed by the certificate manager 125 of FIGS. 1 and 2. In another embodiment, the method 300 is performed by the automatic renewal module 130 that resides outside the certificate manager 125, but within the CA.

Referring to FIG. 3, processing logic begins with searching the CA database to detect certificates that satisfy an expiration condition for automatic renewal (block 302). Processing logic automatically renews the detected certificates as renewed certificates without receiving from a user a certificate renewal request for the certificate (block 303), and the method ends. In one embodiment, the processing logic automatically renews the detected certificate at block 303 by generating a certificate renewal request for each detected certificate that satisfies the expiration condition (block 304), and automatically approving the certificate renewal request when the certificate renewal request is initiated within the CA, e.g., generated within the certificate manager 125, instead of being received from a person (block 306). The processing logic generates a renewed certificate using information from the detected certificate when the certificate renewal request is approved (block 308).

In one embodiment, the expiration condition for automatic renewal is that the certificate has already expired. In another embodiment, the expiration condition for automatic renewal is that the certificate expires within a designated time period. Alternatively, other expiration conditions may be used.

In another embodiment, the processing logic reuses keys of the detected certificate for the renewed certificate, and sets a new expiration date for the renewed certificate. In this embodiment, the renewed certificate is functionally identical to the detected certificate.

In one embodiment, the processing logic at block 302 searches the CA database by searching LDAP entries of a LDAP directory whose expiration dates match the expiration condition. The expiration condition may specify a range of expiration dates. In another embodiment, the processing logic at block 302 searches the CA database for the digital certificates that satisfy the expiration condition and are a designated certificate type (e.g., signing certificates, encryption certificates, etc.). In another embodiment, the processing logic at block 302 determines whether the detected certificate has been revoked, and excludes the detected certificate from automatic renewal when the certificate has been revoked. In another embodiment, the processing logic at block 302 determines a certificate type of the detected certificate and excludes the detected certificate for automatic renewal when the detected certificate is a designated certificate type. The searching may be configured by an administrator to define the search parameters for each of the searches, and/or any filter criteria, such as to not include SSL certificates, for example.

In one embodiment, the processing logic can schedule a job in the certificate manager to search the CA database at a specified time or at a specified interval. The scheduled jobs can be initiated by the certificate manager 125 without user interaction in the method after scheduling the job.

Figure 4:
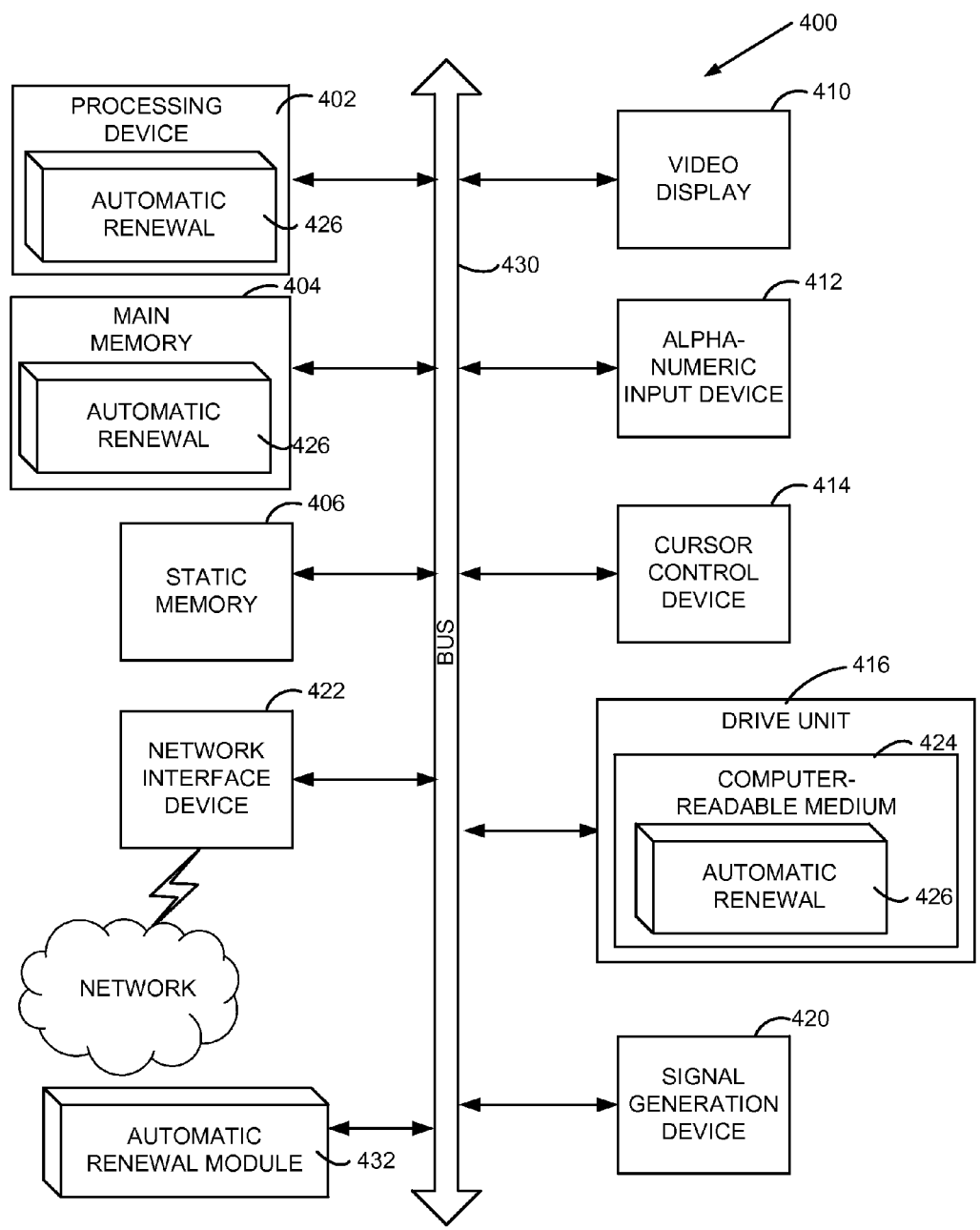
FIG. 4 illustrates a diagrammatic representation of a machine in the exemplary form of a computer system for automatic renewal.

FIG. 4 illustrates a diagrammatic representation of a machine in the exemplary form of a computer system 400 for automatic renewal. Within the computer system 400 is a set of instructions for causing the machine to perform any one or more of the methodologies of automatic renewal discussed herein, may be executed. In alternative embodiments, the machine may be connected (e.g., networked) to other machines in a LAN, an intranet, an extranet, or the Internet.

The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of automatic certificate renewal described above. In one embodiment, the computer system 400 represents various components that may be implemented in the certificate manager 125 as described above. Alternatively, the certificate manager 125 may include more or less components as illustrated in the computer system 400.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., automatic renewal 426) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., automatic renewal 426) embodying any one or more of the methodologies or functions described herein. The automatic renewal 426 may also reside, completely or at least partially, within the main memory 404 and/or within the processing device 402 during execution thereof by the computer system 400, the main memory 404 and the processing device 402 also constituting computer-readable storage media. The automatic renewal 426 may further be transmitted or received over a network via the network interface device 422.

The automatic renewal module 432, components and other features described herein (for example in relation to FIGS. 1-2) can be implemented as discrete hardware components or integrated in the functionality of hardware components such as ASICS, FPGAs, DSPs or similar devices. In addition, the automatic renewal module 432 can be implemented as firmware or functional circuitry within hardware devices. Further, the automatic renewal module 432 can be implemented in any combination hardware devices and software components.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
searching, by a computing system, a certificate authority (CA) database of digital certificates to identify a certificate that satisfies an expiration condition for automatic renewal;
renewing, by the computing system, the certificate as a renewed certificate without any user interaction, wherein the computing system is to renew the certificate in view of the expiration condition, wherein the expiration condition comprises an expiration of the certificate;
generating by the computing system, for each of a plurality of certificates satisfying the expiration condition and identified during the searching, a respective certificate renewal request for automatic renewal;
approving, by the computing system, the respective certificate renewal requests when the respective certificate renewal requests are initiated by the computing system and not by a user; and
renewing each of the plurality of certificates when the respective certificate renewal requests are approved.

2. The method of claim 1, wherein the expiration condition for automatic renewal is that the certificate expires within a designated time period.

3. The method of claim 1, wherein the renewing of the certificate comprises:
reusing a key of the certificate for the renewed certificate; and
setting a new expiration date for the renewed certificate; and
wherein the renewed certificate is functionally identical to the certificate.

4. The method of claim 1, wherein the CA database is a Lightweight Directory Access Protocol (LDAP) directory to contain an LDAP entry for each of the digital certificates, and wherein each LDAP entry comprises information that specifies an expiration date of the corresponding digital certificate.

5. The method of claim 1, wherein the searching of the CA database is to identify a certificate of a particular certificate type that satisfies the expiration condition.

6. The method of claim 1, wherein the searching comprises:
determining whether the certificate has been revoked; and
excluding the certificate from automatic renewal when the certificate is revoked.

7. The method of claim 1, wherein the searching comprises:
excluding the certificate from automatic renewal when the certificate is of a particular certificate type.

8. The method of claim 1, further comprising scheduling a job to search the CA database at a specified time for certificates that satisfy the expiration condition.

9. The method of claim 1, further comprising scheduling a job to search the CA database at a specified time interval for certificates that satisfy the expiration condition.

10. The method of claim 1 wherein the renewing of the certificate is performed without authenticating a user.

11. The method of claim 1, wherein the computing system is part of a CA system.

12. A system comprising:
a data storage device to store digital certificates in a certificate authority (CA) database; and
a processing device, coupled to the data storage device, to:
search the CA database to identify a certificate that satisfies an expiration condition for automatic renewal, and
renew the certificate as a renewed certificate without any user interaction, wherein the computing system is to renew the certificate in view of the expiration condition, wherein the expiration condition comprises an expiration of the certificate,
generate, for each of a plurality of certificates satisfying the expiration condition and identified during the searching, a respective certificate renewal request for automatic renewal;
approve the respective certificate renewal requests when the respective certificate renewal requests are initiated by the computing system and not by a user; and
renew each of the plurality of certificates when the respective certificate renewal requests are approved.

13. The system of claim 12, wherein the renewed certificate comprises a public key of the certificate and a new expiration date, and wherein the renewed certificate is functionally identical to the certificate.

14. The system of claim 12, wherein the processing device is also to:
initiate a job to search the CA database at a specified time for certificates that satisfy the expiration condition; and
generate a certificate renewal request for automatic renewal of the certificates that satisfy the expiration condition.

15. The system of claim 14, wherein the job is initiated via a job scheduler that is implemented as a thread, and wherein the thread is started to do the job each time the job scheduler wakes up.

16. The system of claim 14, wherein the job is initiated via a job scheduler, and wherein the processing device is also to provide an administrator interface to enable an administrator of the CA to configure the job scheduler and to specify the expiration condition.

17. The system of claim 12, wherein the processing device is also to execute a certificate manager, and wherein the system further comprises a directory server to manage a Lightweight Directory Access Protocol (LDAP) repository, and wherein the certificate manager comprises:
a job scheduler to initiate a job to search the LDAP repository to identify certificates that satisfy the expiration condition;
a search agent to search the LDAP repository according to the job; and
a renewal request generator to generate a certificate renewal request for automatic renewal for each certificate identified by the search agent satisfying the expiration condition.

18. A non-transitory machine-readable storage medium comprising instructions, which when executed, cause a processing device to perform operations comprising:
searching, by the processing device, a certificate authority (CA) database that stores digital certificates to identify a certificate that satisfies an expiration condition for automatic renewal;
renewing, by the processing device, the certificate as a renewed certificate,
wherein the searching and renewing are performed by the processing device without any user interaction, wherein the processing device is to renew the certificate in view of the expiration condition, wherein the expiration condition comprises an expiration of the certificate;
generating by the processing device, for each of a plurality of certificates satisfying the expiration condition and identified during the searching, a respective certificate renewal request for automatic renewal;
approving, by the processing device, the respective certificate renewal requests when the respective certificate renewal requests are initiated by the processing device and not by a user;
and renewing each of the plurality of certificates when the respective certificate renewal requests are approved.

* * * * *